(12) United States Patent
Roseborough (10) Patent No.: US 8,707,288 B2
(45) Date of Patent: Apr. 22, 2014

(54) SYSTEM FOR AUTOMATIC MANAGEMENT OF APPLICATIONS ON REMOTE DEVICES

(75) Inventor: James Roseborough, Piedmont, CA (US)

(73) Assignee: MobiTV, Inc., Emeryville, CA (US)

( * ) Notice: Subject to any disclaimer, the term of this patent is extended or adjusted under 35 U.S.C. 154(b) by 980 days.

(21) Appl. No.: 12/371,491

(22) Filed: Feb. 13, 2009

(65) Prior Publication Data

US 2010/0211941 A1    Aug. 19, 2010

(51) Int. Cl.
*G06F 9/44* (2006.01)

(52) U.S. Cl.
USPC ........................................... 717/170; 717/168

(58) Field of Classification Search
USPC .......................................................... 717/170
See application file for complete search history.

(56) References Cited

U.S. PATENT DOCUMENTS

| | | | | |
|---|---|---|---|---|
| 6,496,979 | B1* | 12/2002 | Chen et al. ..................... | 717/178 |
| 7,079,839 | B1* | 7/2006 | Papineau ........................ | 455/418 |
| 7,239,877 | B2* | 7/2007 | Corneille et al. ........... | 455/456.3 |
| 7,454,748 | B2* | 11/2008 | Ari-Pekka et al. ............. | 717/174 |
| 7,565,381 | B2* | 7/2009 | Oswalt .................................. | 1/1 |
| 7,865,151 | B2* | 1/2011 | Cho .............................. | 455/90.3 |
| 2004/0205749 | A1* | 10/2004 | Dalton et al. .................. | 717/178 |
| 2004/0237083 | A1* | 11/2004 | Alcazar et al. ................. | 717/178 |
| 2007/0192329 | A1* | 8/2007 | Croft et al. ....................... | 707/10 |
| 2007/0198656 | A1* | 8/2007 | Mazzaferri et al. ........... | 709/218 |
| 2007/0271557 | A1* | 11/2007 | Geisinger ...................... | 717/163 |
| 2008/0052705 | A1* | 2/2008 | Kaufman et al. .............. | 717/174 |
| 2008/0098006 | A1* | 4/2008 | Pedersen et al. ................ | 707/10 |
| 2008/0201705 | A1* | 8/2008 | Wookey ......................... | 717/175 |
| 2009/0241104 | A1* | 9/2009 | Amiga et al. .................. | 717/174 |
| 2010/0162232 | A1* | 6/2010 | Bhatia et al. .................. | 717/178 |

OTHER PUBLICATIONS

Notification of Transmittal of the International Search Report and the Written Opinion of International Searching Authority, mailed Feb. 26, 2010, for Application No. PCTUS 10/21058.

* cited by examiner

*Primary Examiner* — Don Wong
*Assistant Examiner* — Theodore Hebert
(74) *Attorney, Agent, or Firm* — Kwan & Olynick LLP (57) ABSTRACT

Management of applications on remote devices is performed independently of managing platform software. A per platform player using a common protocol to communicate and receive applications is installed on a device. The player is developed and installed independently of applications which run using commands supported by the player. On player startup, the player obtains boot instructions, fetches an application manifest, and obtains player and application resources using the application manifest from a content and application server. The content and application server determines application resources to send to the player and tracks applications and application versions installed on a per user/per platform basis.

16 Claims, 9 Drawing Sheets

SYSTEM FOR AUTOMATIC MANAGEMENT OF APPLICATIONS ON REMOTE DEVICES

TECHNICAL FIELD

The present disclosure relates to management including installation, update, and maintenance of applications on remote devices such as wireless devices.

DESCRIPTION OF RELATED ART

Applications having a set of functions and capabilities are typically installed on a computer system or device and maintained through fixes, patches, and upgrades. Manual intervention is often required to upgrade, replace, remove, or otherwise maintain an application. Some systems allow an application to query a server to automatically detect whether a patch or an updated version of the application is available. The application may periodically query the server or may query the server upon startup. The application can then prompt the user on whether to download and install the update.

In other instances, users are responsible for upgrading and patching applications. In some instances, users learn of fixes and upgrades after the software problems, deleterious effects, or incompatibilities are apparent. Even with periodic updates and user initiated upgrades, mechanisms for managing applications on remote devices are limited. Consequently, it is desirable to provide improved mechanisms for managing applications.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of mobile devices having limited processing resources. However, it should be noted that the techniques of the present invention apply to a variety of devices. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Management of applications on remote devices is performed independently of managing platform software. A per platform player using a common protocol to communicate and receive applications is installed on a device. The player is developed and installed independently of applications which run using commands supported by the player. On player startup, the player obtains boot instructions, fetches an application manifest, and obtains player and application resources using the application manifest from a content and application server. The content and application server determines application resources to send to the player and tracks applications and application versions installed on a per user/per platform basis.

Example Embodiments

Various desktop applications and operating systems are typically provided in a relatively finalized form. The finalized form includes a substantially complete set of functions and capabilities. Developers are somewhat limited in the functions and capabilities that can be enhanced using patches and updates. Consequently, full upgrades are periodically required. In some instances, the patches and updates are downloaded and installed by users. In other instances, the patches and updates are detected by the application and downloaded and installed after some form of user authorization or user preauthorization. Full upgrades however, require substantially more user intervention.

The problem can become exponentially more complex in a mobile device environment. Mobile device environments typically include numerous manufacturers and devices with different hardware capabilities. Even the same class or type of device may have different platforms and machines installed. Furthermore, the network environment may be changing continuously, so network proxy settings are variable over time.

Patches and updates may be required more frequently as devices, platforms, and networks have different required fixes at various times. Applications like media players, guide viewers, productivity software, etc., on the devices may require constant patching and updating. In many instances, the applications may have to be somewhat disruptively reinstalled.

Consequently, the techniques and mechanisms of the present invention provide an application management system that allows remote management of applications that run on different platforms on disparate devices on a wide variety of wireless networks. According to various embodiments, management of applications can be performed independently of management of user platforms such as virtual machines.

In particular embodiments, a per-platform player application uses a common protocol to interact with an application and content server and obtain applications and application logic. According to various embodiments, the player is a thin client media application operable to run on a platform common to multiple devices. The player is developed and installed independently of applications that include commands supported by the player. The player is also developed and installed independently of additional player portions or player logic that run on commands supported by the player. According to various embodiments, a basic boot script is run on player startup to perform a conditional get against the content and application server. In some instances, the basic boot script obtains a detailed boot script with updated network and server information. In other embodiments, a boot script is run to obtain an application manifest to allow download of new portions and components of the player itself. In particular embodiments, the initial boot script has the basic logic to obtain more detailed logic for downloading and installing applications and application logic.

According to various embodiments, the content and application server maintains application information about individual devices. In particular embodiments, the content and application server determines which application to send to the requesting player, delivers the applications to run on the player, and tracks the version of the installed application on a per user/per platform basis.

According to various embodiments, launching a player on a device involves a player fetching application boot instructions from the server, obtaining an application manifest, and using the application manifest to obtain application logic and resources. According to various embodiments, the boot instructions are sent as a single script delivered in response to the execution of an initial set of boot instructions. In some embodiments, an application manifest includes a listing of all of the code and non-code image resources included in an application. The application manifest may also include resource locations, program listing, and indices. The boot script and application manifest may be persisted locally on the device after fetch.

According to various embodiments, launch is made from a persisted copy if it exists. The boot script and application manifest are refetched after launch using mechanism such as conditional get.

In particular embodiments, a content and application server determines what to provide in an application manifest by referencing an application identifier and a player user identifier (UID). In particular embodiments, the application identifier is encoded in a service URL, which is the location of a network resource that will be used to fetch the player. This simplifies creation and management of various applications on the server side, since each application can be in its own server subsystem. The player UID is provided either by a player or assigned by a content and application server if the player does not have an assigned UID. The player can then persist the UID locally. In some instances, the player UID is provided at vending time or may be derived from other identifiers the network may already provide about the player, the device it is running on, the user account, etc.

The application manifest provides application resources for the device to obtain. According to various embodiments, resources such as applications and applications logic are fetched using a unique hash as a resource identifier. In particular embodiments, resources are persisted after fetching using simple get mechanisms. Unused resources from past versions are culled after successful launch of a new version.

Figure 1:
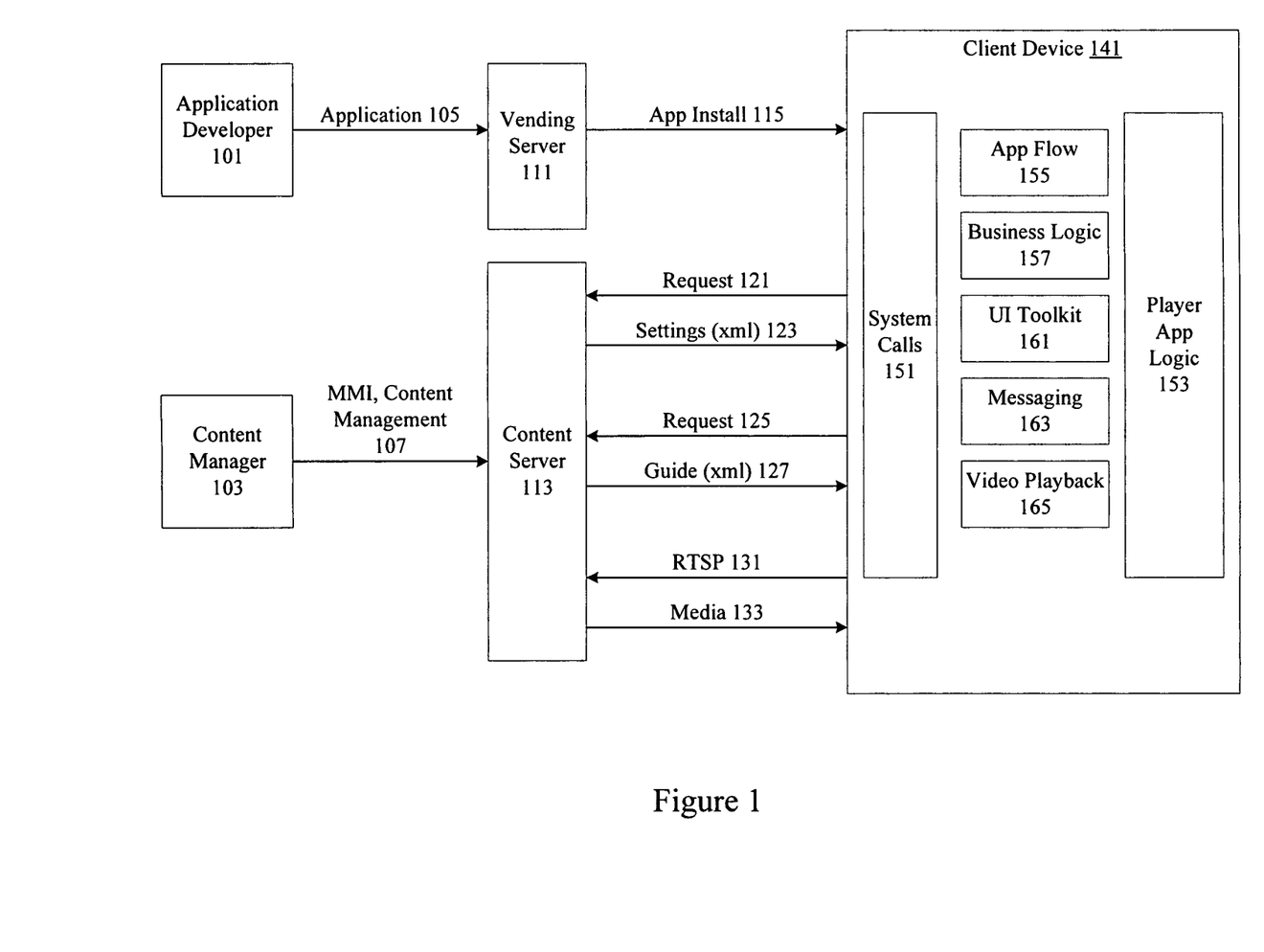
FIG. 1 illustrates an architecture for providing and managing application logic on a reprogrammable client.

FIG. 1 illustrates one example of a system for installing and interacting with applications on client devices. An application developer 101 provides a finalized application 105 to a vending server 111. The application 105 is finalized in a variety of aspects, including messaging logic, application logic, and application program interface logic. The vending server 111 installs the application at 115 on a client device 141. The client device may be a mobile device such as a mobile phone. According to various embodiments, the application is provided using Java and Java 2 Platform Micro Edition (J2ME). However, technologies like J2ME have no dynamic class loading, no serialization support, no runtime metadata support. Furthermore, application program interface sets vary. Application extensions, upgrades, and enhancements are only allowed through forced upgrade. The client device 141 has essentially fixed system call logic 151, application flow logic 155, business logic 157, user interface logic 161, messaging logic 163, video playback logic 165, and player application logic 153.

According to various embodiments, content managers 103 send content management information 107 to a content server 113. In particular embodiments, the client device 141 sends requests 121, 125, and 131 to the content server 113 for settings 123, guide data 127, and media 133. Requests for media may be made using the Real-time Streaming Protocol (RTSP). The settings and guide data may be provided using XML, which requires its own parser on the client device. XML could be used to provide an application, but XML is generally a very poor mechanism for expressing application logic.

Figure 2:
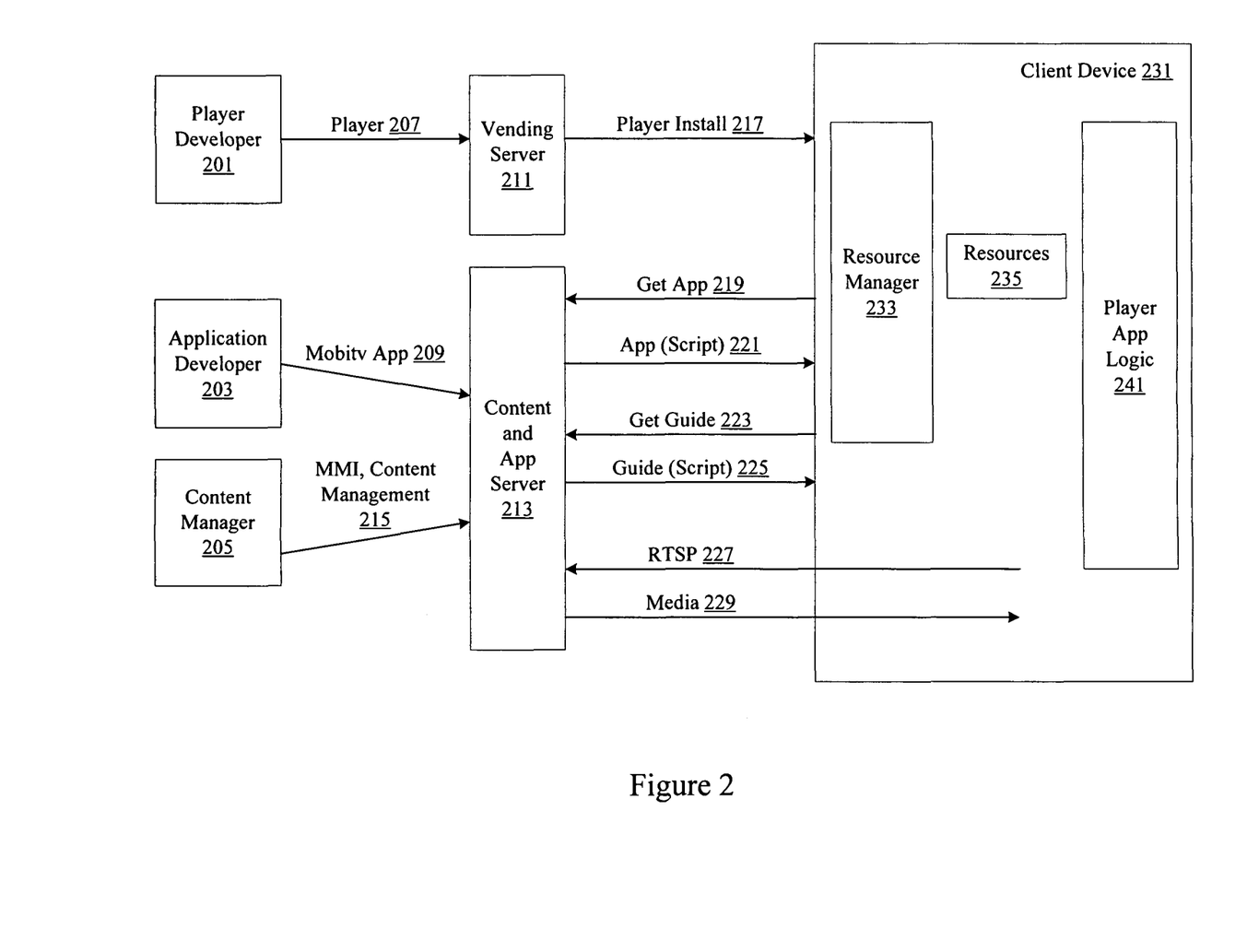
FIG. 2 illustrates an architecture for providing and managing application logic on a reprogrammable client using uniform bytecode.

FIG. 2 illustrates one example of providing and managing applications on a client device using bytecode. According to various embodiments, a player developer 201 provides a player 207 such as a media player 207 to a vending server 211. In particular embodiments, the player 207 does not need to be provided in finalized form. According to various embodiments, the player merely includes working platform application program interface (API) logic. The player is installed at 217 on the underlying native platform of the client device 231. According to various embodiments, the underlying native platform operates using Java or C. The client device no longer has to be installed with an essentially finalized version of application flow logic, system call logic, application flow logic, business logic, and user interface logic. Player application logic 241 is essentially fixed, but is provided as a thinnest possible layer of logic connected to resources 235 and resource manager 233.

Application developers 203 provide application logic 209 to content and application server 213. Content manager 205 provides content management information 215 to content and application server 213. According to various embodiments, the client device 231 issues requests such as a get application request 219 to obtain applications 221 from the content and application server 213. According to various embodiments, applications 221 are provided using bytecode after the content and application server receives the player request 219 and determines which application to send to the client device 231. In some embodiments, the content and application server 213 sends application 221 to the client device 231 in portions. According to various embodiments, the content and application server 213 also tracks the version of the installed application on a per user and per platform basis. Applications and application portions are provided using bytecode.

Guide data 225 may also be provided in response to a get guide 223 request. In particular embodiments, all client device 231 requests include a player user identifier. The player user identifier is typically assigned by a content and application server when the client device 231 does not provide one in its requests. In particular embodiments, if the client does not yet have a player user identifier, it persists the one it receives from the content and application server. In other embodiments, the vending server provides a player user identifier to the client device 231 when the player is installed at 217. In still other embodiments, the player user identifier is derived from other identifiers that the network may already provide about the player, the device it is running on, the user account, or any suitable user information. In particular embodiments, an RTSP request 227 is send to the content and application server 213 to retrieve media 229.

According to various embodiments, the client device 231 has a bytecode interpreter that processes the bytecode, whether the bytecode represents application logic that provides highly tailored application experiences to a user, system calls that direct the client device 231 to present a page or navigate a page, or messaging data such as guide data 225 provided as a table of data wrapped in bytecode. In particular embodiments, executing bytecode produces deserialized objects that are presented as Lua data structures. The bytecode may pass a table of guide data, subscription information, authentication tokens, user properties, management data, etc. The user can be pass data back to the server using bytecode if the client has a compiler, or the user may pass data back to the server using plain text.

The player 207 can be shipped with a limited feature set while still allowing flexibility in expanding, updating, and enhancing client applications. The client can be made extremely thin, as only a byte-code interpreter is required. No parsing or compiling is required. It is acknowledged that there is more processing required at the content and application server, but less processing is required at the client device 231.

According to various embodiments, the player 207 uses a common protocol to communicate and receive applications appropriate for the underlying platform and associated end-user subscriptions. The player 207 may be developed and installed independently of the application, which includes commands run on the player.

Figure 3:
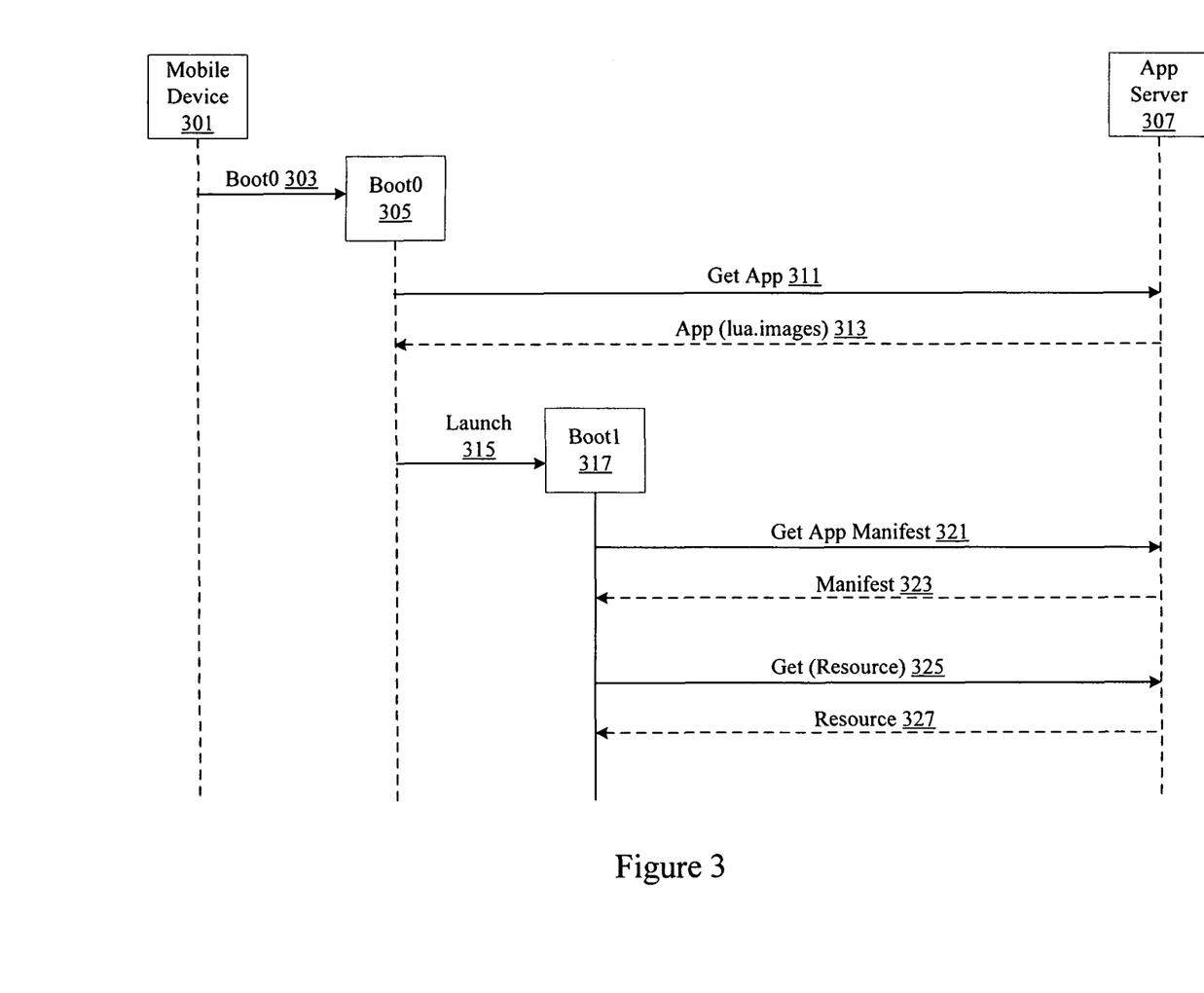
FIG. 3 illustrates an interaction diagram for delivering application logic.

FIG. 3 illustrates one mechanism for delivering applications to client devices. According to various embodiments, applications are delivered over-the-air (OTA) to client devices. In particular embodiments, client devices maintain logic for downloading and upgrading applications. According to various embodiments, a client device 301 has a boot0 program 303 activated during initialization. The program may also be started at points as well. The boot0 program 303 starts a boot0.lua script 305 that sends a get application message 311 to an application server 307. In particular embodiments, the boot0 program 303 is a basic, static program that is used to obtain a boot1 program to obtain application logic. According to various embodiments, the get application message 311 includes current application context such as carrier information, device information, a user identifier, a current application version, etc. The application server 307 identifies appropriate applications, application logic, features corresponding to the current application context provided by the client device 301. The application server 307 returns an application 313 to allow the client device to obtain the application logic.

At 315, the boot1 program 317 is launched to send a get application manifest message 321 to the application server 307. The application server dynamically constructs as needed an application manifest 323. The application manifest describes the application name, version, and application artifacts that the client device 301 needs to download. The client device then makes a get resource request 325 to obtain the application logic and artifacts 327 from the application server 307.

Figure 4:
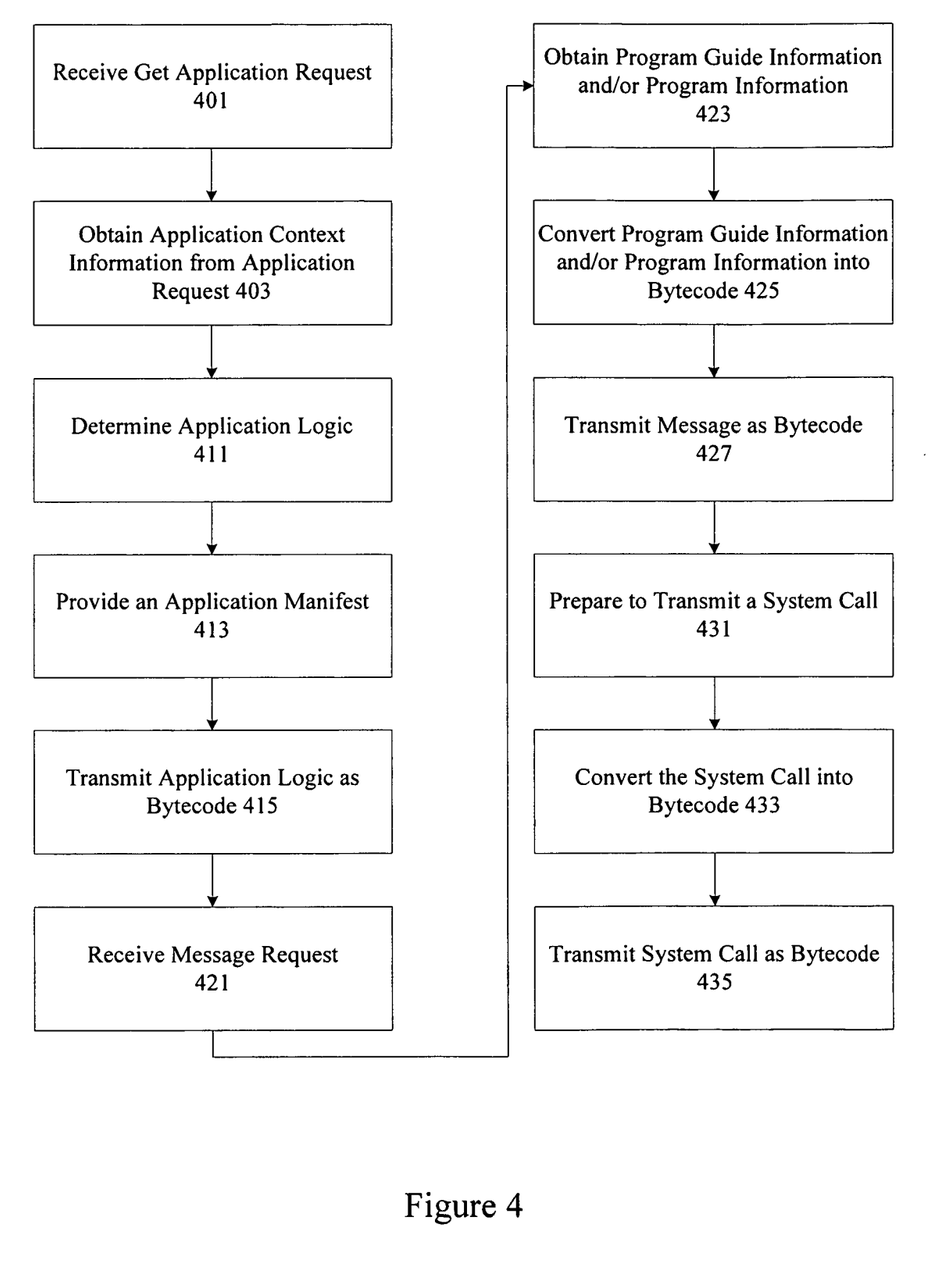
FIG. 4 illustrates application server processing.

FIG. 4 illustrates one example of application and content server processing. At 401, the content server receives a get application request. According to various embodiments, the content server obtains application context information at 403 from the application request. The application context information may include a carrier identifier, a device identifier, a user identifier, a current application identifier, an application version number, etc. Using the application context information, the application and content server determines application logic at 411 for download to the client device. In particular embodiments, the application and content server provides an application manifest at 413 to the client device. As the content server receives request from the client device, the content server transmits application logic as bytecode to the client device at 415.

According to various embodiments, the content and application server receives a message request at 421. In particular embodiments, the message request may be a program guide request or a program information request. The content and application server obtains program guide information and/or program information at 423. At 425, the content and application server converts the program guide information and/or program information into bytecode. In particular embodiments, a message to bytecode generator creates a bytecode object for each request, response, message, etc. The message is transmitted as bytecode to the client device at 427.

At 431, the content and application server prepares to transmit a system call to the client device. At 433, the content and application server converts the system call such as a load page request into bytecode. In particular embodiments, a system call to bytecode generator creates a bytecode object for each system call. The system call is transmitted as bytecode to the client device at 435.

Figure 5:
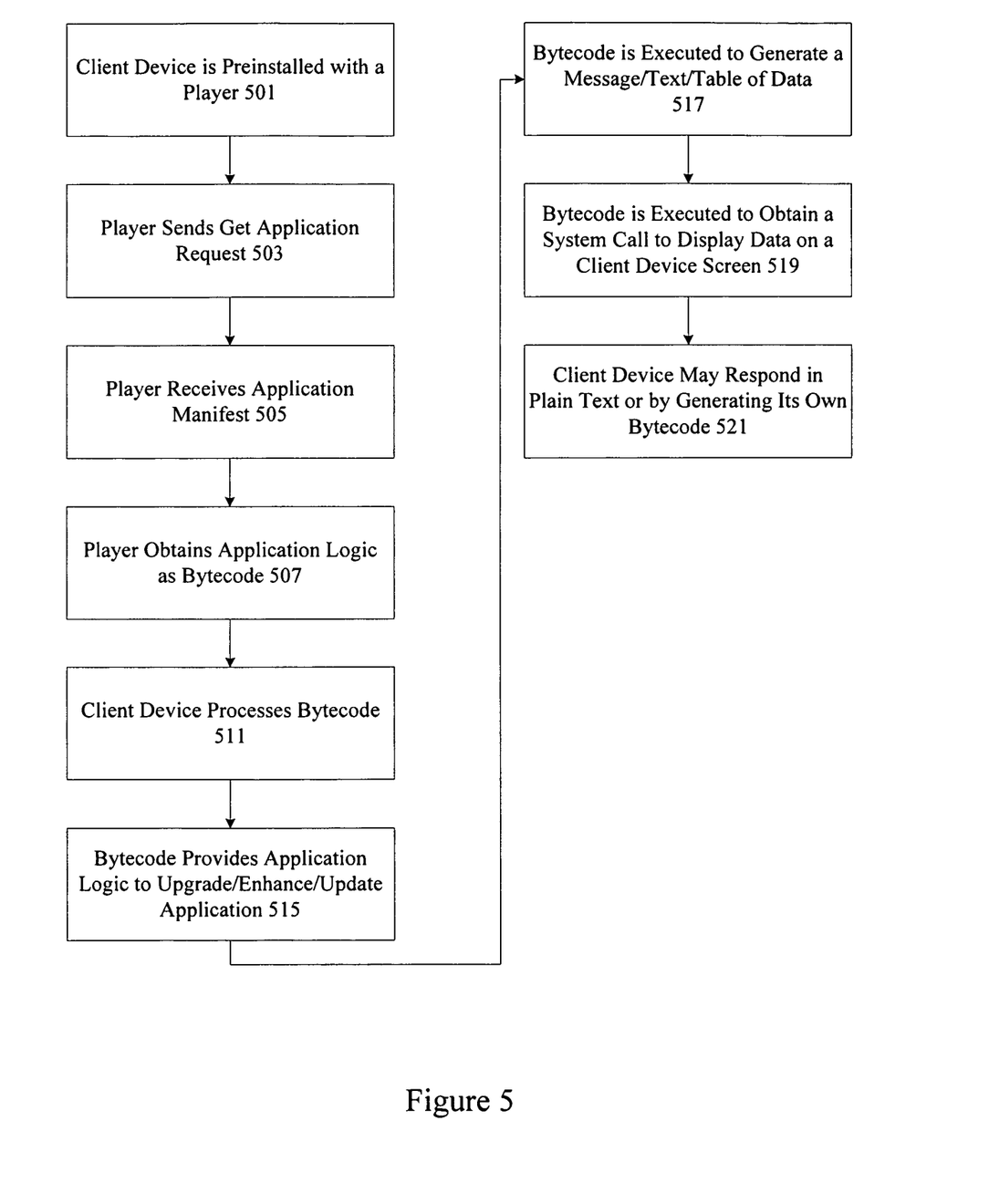
FIG. 5 illustrates reprogrammable client processing.

FIG. 5 illustrates a particular example of client processing. According to various embodiments, a client device is preinstalled with a player such as a media player at 501. The media player includes a boot0 program that is launched at various times such as initialization. The boot0 program obtains a boot1 program used to obtain application logic. At 503, the player sends a get application request to a content and application server. The player receives an application manifest at 505. The player obtains application logic as bytecode from the content and application server at 507. At 511, the client device processes the bytecode using a client side interpreter.

According to various embodiments, the bytecode provides application logic to upgrade, enhanced, or update an application at 515. In particular embodiments, the bytecode is executed to generate a message, text, or a table of data 517. In other embodiments, the bytecode is executed to obtain a system call 519 to display data on a client device screen. At 521, the client device may respond in plain text or by generating its own bytecode.

Figure 6:
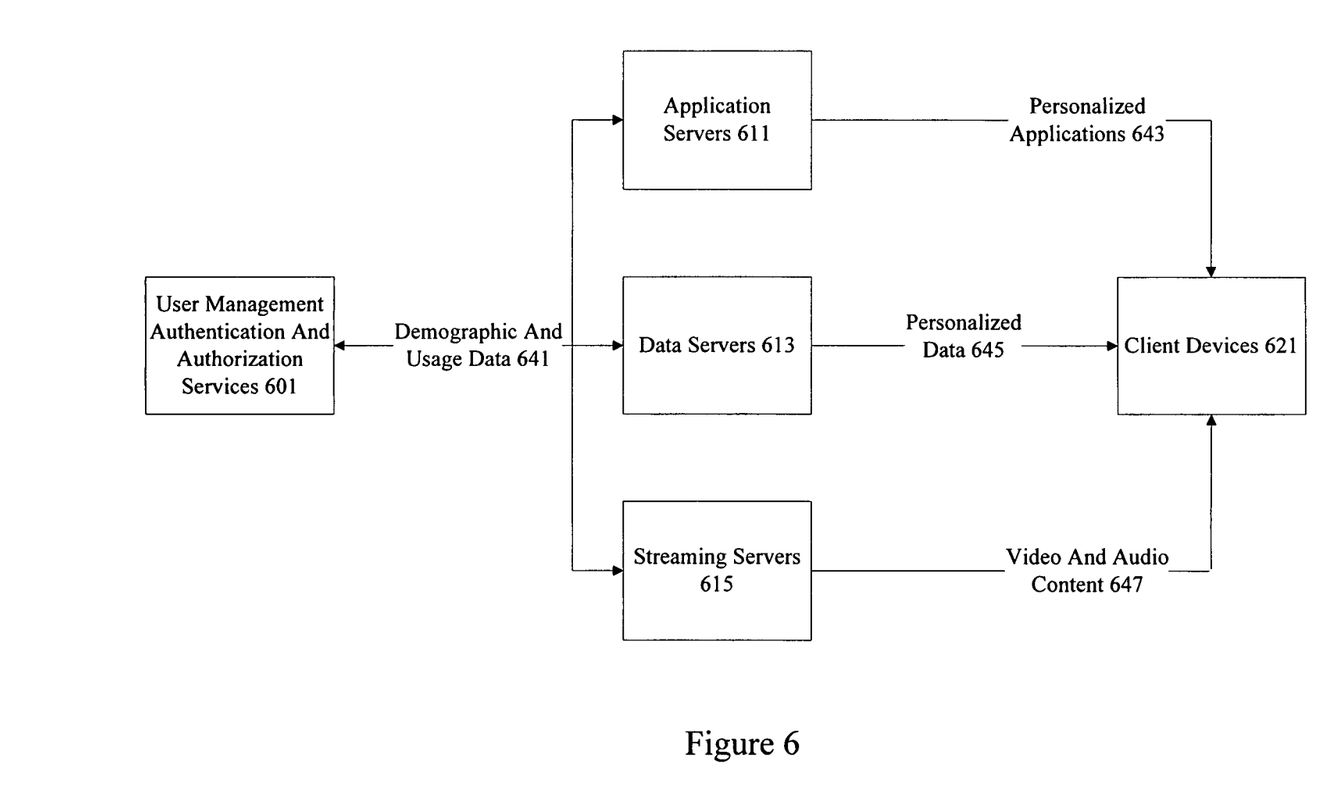
FIG. 6 illustrates one example of a client side interpreter platform.

The techniques and mechanisms of the present invention can be implemented in a variety of systems. FIG. 6 illustrates one example of a system that includes mobile devices.

According to various embodiments, a client side interpreter platform includes client components and server components. Server components include applications servers 611, data servers 613, and streaming server 615. In particular embodiments, the server operate to deploy, maintain, and update client side interpreter applications. In some examples, user management, authentication, and authorization services are provided along with the ability to integrate with service provider facilities. Application servers 611 provide personalized applications 643 to client devices 621 such as mobile devices. According to various embodiments, the application servers 611 provide application updates. Carriers can easily upgrade, modify, or personalize client applications for delivery to end users or groups of end users based on usage patterns, geographical location, user preferences, subscription type, and device capabilities.

Data servers 613 provide personalized data 645 to client devices 621. In particular embodiments, the data servers 613 manage channel guides and personalized data for individual users. Demographic and usage data 641 is shared with user management authentication and authorization services 601 to provide a personalized user experience based on a user's subscriptions, geographical location, preferences, and device capabilities. Streaming servers 615 provide video and audio content 647 to client devices 621. According to various embodiments, the streaming servers 615 deliver audio and video content to clients. Content can include live television, video on demand (VoD), user generated, and audio.

According to various embodiments, the client side interpreter platform allows rapid development and deployment of applications across a broad range of devices for a variety of users. Applications can be ported to emerging handset and desktop environments efficiently while providing a personalized user experience. Seamless over the air (OTA) upgrades are supported for a number of flexible applications. In particular embodiments, the client side interpreter platform simplifies and streamlines the development process and offers flexibility for updating, modifying, and personalizing applications. It supports separate development of client players and applications, allowing carriers to update and redeploy applications as often as necessary.

In particular embodiments, mobile applications generally fall into two categories: applications that provide access to mobile browser (WAP) pages and custom applications built for each device. The browser pages work on all devices and can be updated at any time, but they provide a poor user experience. Custom applications provide a better user experience but are costly, slow to develop, difficult to deploy, and hard to upgrade.

The client side interpreter platform provides a lightweight standard scripting engine that can be quickly ported to any mobile device. Only the engine is ported, not the entire application. Developing this way is faster and more reliable, because the engine is significantly less complex than the entire application, and once it is ported, it can be reused for many different applications and version upgrades.

The client side interpreter application can be updated on the server at any time. The client side interpreter engine queries the server for the latest rules regarding mandatory and optional upgrades and available versions of the application. To end users, however, the application appears to be custom made for their individual devices, with all available enhanced graphics and user interfaces Developers can add, change, or remove features at any time. For example, a one time promotional feature could appear only during the promotion time frame without being tied to the handset release. Customization based on user, device, location, time, or any number of options is possible. The client side interpreter platform provides a new level of dynamic custom application creation and distribution.

In the competitive mobile marketplace, service providers face increasing pressure to rapidly develop, test and deploy client applications. By decoupling player and application development, the client side interpreter interpreted allows rapid development of lightweight, scripted applications on short development cycles. The player and application development can proceed in parallel, greatly reducing time to market. The client side interpreter also provides tremendous flexibility in how applications are made available to subscribers. For example, applications may be made available through preloads, vended applications, and OTA upgrades.

Figure 7:
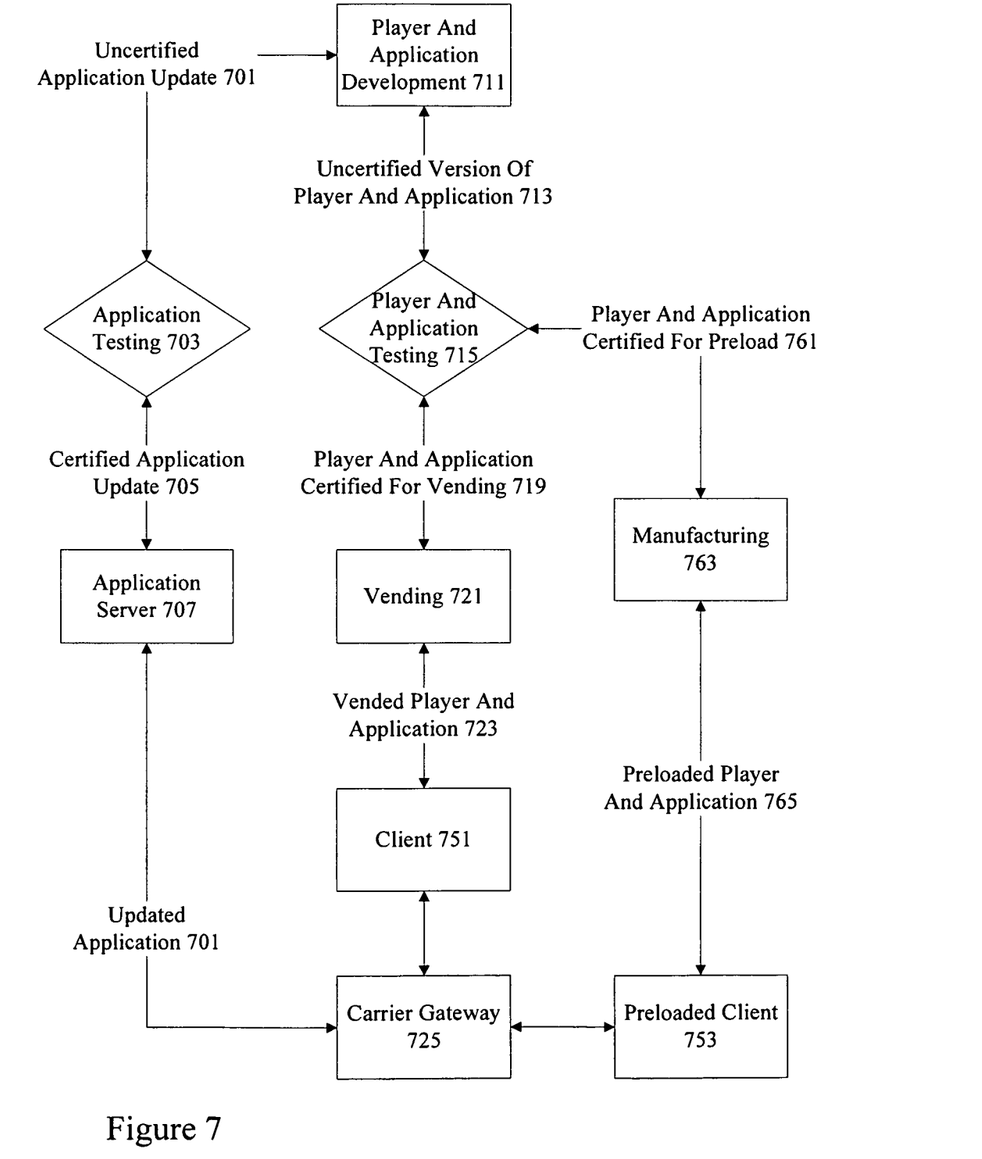
FIG. 7 illustrates examples of client side interpreter application development, testing, and vending mechanisms.

FIG. 7 illustrates mechanisms for development, testing, and vending processes. According to various embodiments, a client side interpreter application can be provided on a client device in a variety of manners. According to various embodiments, device manufacturers can preload the client side interpreter player and application during the manufacturing process. Player and application development 711 provides an uncertified version of the player and application 713 to player and application testing 715. Once a player and application is certified for preload at 761, they are provided to manufacturing 763. Manufacturing provided a preloaded player and application 765 onto a preloaded client 753 such as a preloaded mobile device.

OTA upgrades are also supported. According to various embodiments, once the client side interpreter player is on the client device, carriers can update the application OTA as often as necessary and in as targeted a manner as necessary. For example, they can provide different applications to different user groups. In particular embodiments, an uncertified application update 701 may be provided for application testing 703. The certificated application update 705 is provided to an application server 707. The updated application 709 is provided to a carrier gateway 725 that can send the updated application 709 to client devices 751 and 753 OTA.

If the client side interpreter player is not preloaded on a device or provided OTA, carriers may make the client side interpreter player and applications available through their vending services. They also may support applications vended through third parties. According to various embodiments, a player and application certified for vending 719 is provided to vending component 721. The vended player and application 723 is provided to a client 751. As often as necessary, carriers can provide end users with updated versions of the client application OTA through an application delivery server. Application updates require no changes to the client player.

Figure 8:
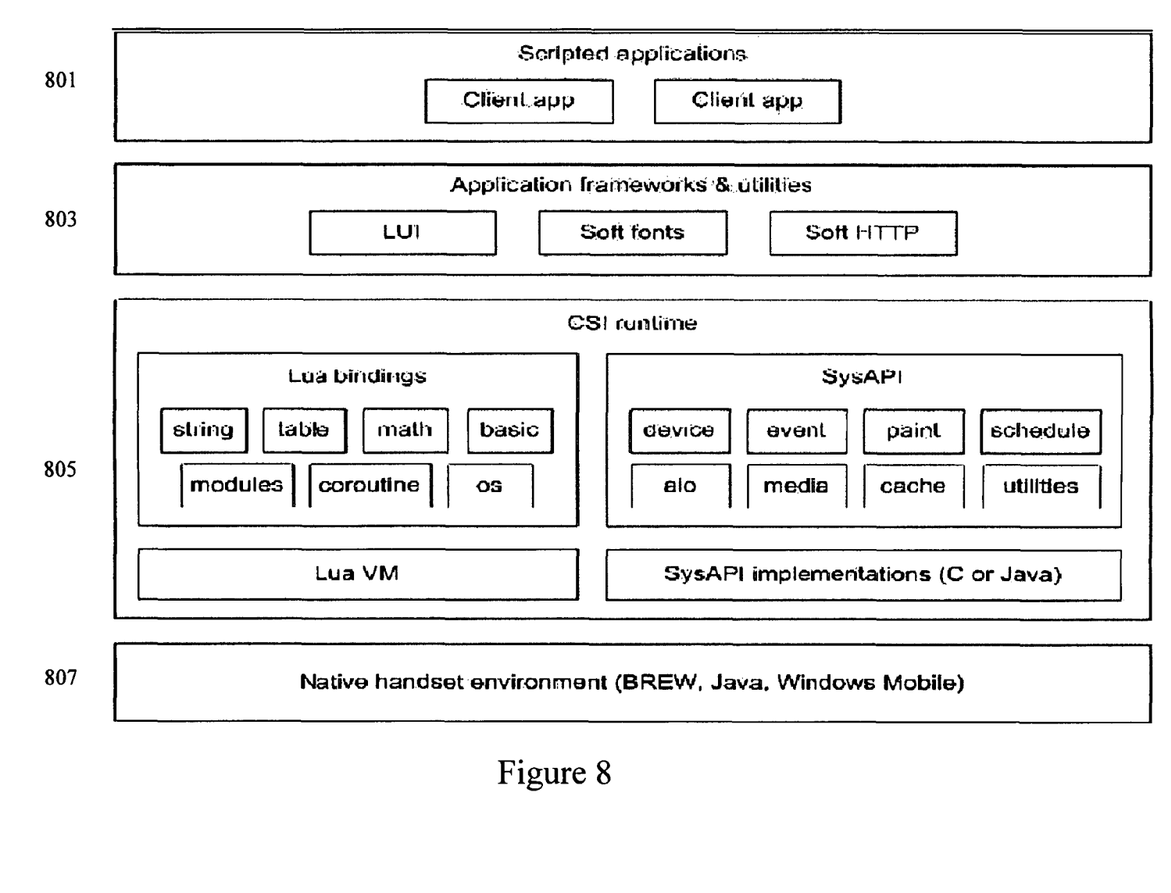
FIG. 8 illustrates one example of a client side interpreter architecture.

FIG. 8 shows an overview of the client side interpreter client architecture. According to various embodiments, client side interpreter applications are built on several layers including a scripted applications layer 801, an application frameworks and utilities layer 803, a runtime layer 805, and a native handset environment layer 807. According to various embodiments, the client side interpreter supports the native handset environments Sun Java™, QUALCOMM® BREW™, and Microsoft® Windows Mobile®, which are recognized as not sufficiently supporting cross-platform portability and re-use. Consequently, the client side interpreter platform incorporates support for each of the above noted handset environments. According to various embodiments, the client side interpreter platform runs on any existing mobile device platform.

According to various embodiments, applications layer 801 includes scripted client applications. Scripted applications can access either the application frameworks or the client side interpreter runtime. Applications are written in Lua, a lightweight and expressive language. Layer 803 includes frameworks and utilities such as soft fonts, soft HTTP, LUI, etc. The soft fonts and soft HTTP utilities allow applications to use fonts or HTTP that work the same way on any handset. These provide an alternative to native fonts or HTTP. Application frameworks and utilities 803 allow a high degree of control over the user interface. The client side interpreter layer 805 includes a virtual machine, implementations, bindings, and utilities that make up the client side interpreter player. According to various embodiments, a Lua virtual machine is a client interpreter for the Lua programming language. In particular embodiments, the Lua virtual machine runs on top of other virtual machines. It runs on Java, BREW, and Windows Mobile and provides full Lua language support. The SysAPI implementations include bindings in the SysAPI. The SysAPI implementations are tuned to perform optimally on each individual device that the service supports.

In particular embodiments, the SysAPI is a common interface to generic mobile device capabilities, including screen paint operations, media playback, and network IO. Developers can write code in Lua to interact with the SysAPI. The Lua bindings provide basic Lua functions, including string, table, math, basic, modules, coroutine, and os. According to various embodiments, the Lua user interface (LUI) is a declarative UI framework that provides navigation, screen flow, and basic UI widgets. It provides a high degree of correspondence between UI specifications and code that implements them.

An over the air update function is included in the client side interpreter player and requests the client application code from the application server. Client side interpreter applications implement specific application behaviors, including authenticating the user, requesting programming guide data and related graphics, screen painting operations, responding to user input, and requesting media streams from a streaming server.

Figure 9:
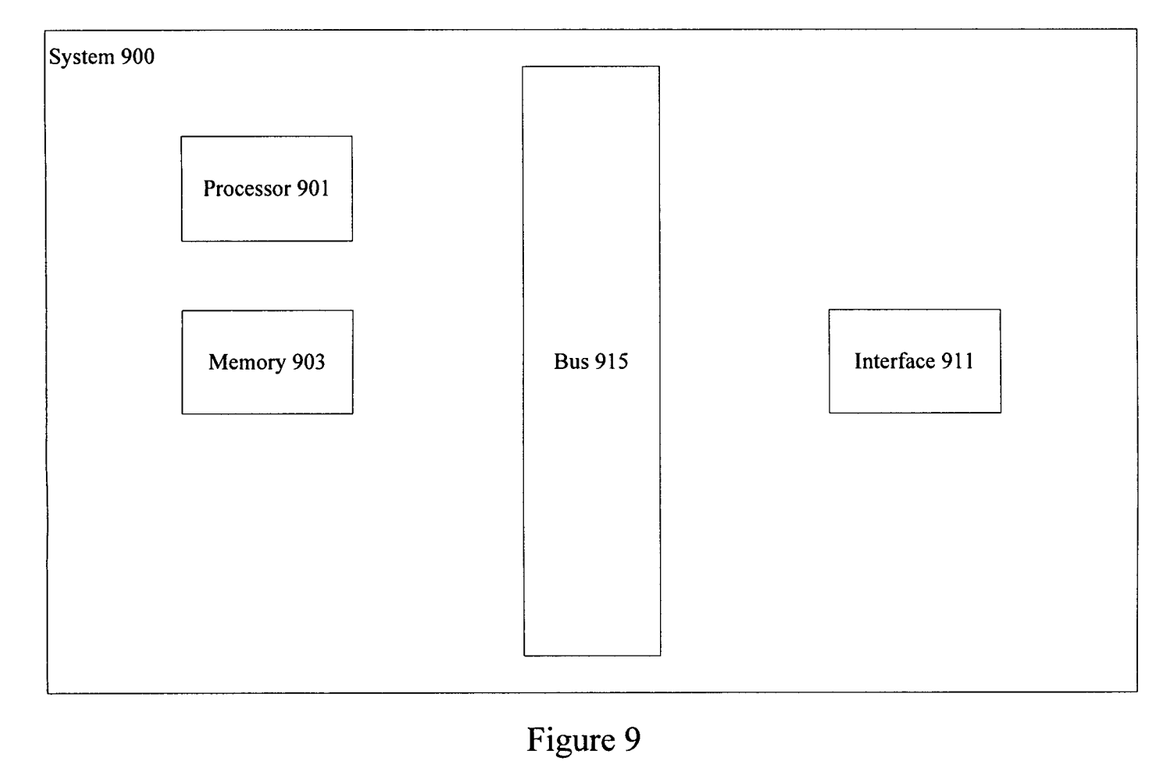
FIG. 9 illustrates one example of a server.

FIG. 9 illustrates one example of a server that can be used as an applications server, data server, or streaming server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 900 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 991 handles requests and responses for media content related transactions while a separate streaming server provides the actual media streams.

Although a particular content server 991 is described, it should be recognized that a variety of alternative configurations are possible. For example, some modules such as a report and logging module 953 and a monitor 951 may not be needed on every server. Alternatively, the modules may be implemented on another device connected to the server. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
maintaining application information on a per user and per-platform basis for a plurality of user identifiers at an application server, the plurality of user identifiers associated with a plurality of client devices, wherein application information includes information about application versions installed on the plurality of client devices, wherein a plurality of platforms are associated with the plurality of client devices;
generating an application manifest for delivery to a designated one of the plurality of client devices, wherein the application manifest is generated by determining a user identifier corresponding to the designated client device;
transmitting application logic to the designated client device, wherein the application logic is identified in the application manifest, wherein the application logic comprises computer programming code capable of being executed by the designated client device, and wherein the application logic is selected based on the application information that is associated with the client device and that is stored on the application server.

2. The method of claim 1, wherein the plurality of platforms comprise a plurality of virtual machines.

3. The method of claim 1, wherein the application manifest includes resource locations, program listings, and indices.

4. The method of claim 1, wherein the application manifest includes code and non-code resources.

5. The method of claim 1, wherein the client device is associated with a platform.

6. The method of claim 5, wherein a player application runs on the platform on the client device.

7. The method of claim 6, wherein the application logic runs using commands supported by the player application.

8. The method of claim 6, wherein the player is a media player.

9. The method of claim 1, wherein the plurality of client devices comprise a plurality of mobile devices.

10. The method of claim 1, wherein the client device runs a basic boot script upon startup to obtain a detailed boot script from the application server.

11. The method of claim 1, wherein the client device runs a boot script upon startup to obtain the application manifest.

12. A system, comprising:
- memory operable to maintain application information on a per user and per platform basis for a plurality of user identifiers at an application server, the plurality of user identifiers associated with a plurality of client devices, wherein application information includes information about application versions installed on the plurality of client devices, wherein a plurality of platforms are associated with the plurality of client devices;
- a processor operable to generate an application manifest for delivery to a designated one of the plurality of client devices, wherein the application manifest is generated by determining a user identifier corresponding to the designated client device;
- an interface connected to the processor, the interface operable to transmit application logic to the client device, wherein the application logic is identified in the application manifest, wherein the application logic comprises computer programming code capable of being executed by the designated client device, and wherein the application logic is selected based on the application information that is associated with the client device and that is stored on the application server.

13. The system of claim 12, wherein the plurality of platforms comprise a plurality of virtual machines.

14. The system of claim 12, wherein the application manifest includes resource locations, program listings, and indices.

15. The system of claim 12, wherein the application manifest includes code and non-code resources.

16. An apparatus, comprising:
- means for maintaining application information on a per user and per platform basis for a plurality of user identifiers at an application server, the plurality of user identifiers associated with a plurality of client devices, wherein application information includes information about application versions installed on the plurality of client devices, wherein a plurality of platforms are associated with the plurality of client devices;
- means for generating an application manifest for delivery to a designated one of the plurality of client devices, wherein the application manifest is generated by determining a user identifier corresponding to the designated client device;
- means for transmitting application logic to the client device, wherein the application logic is identified in the application manifest, wherein the application logic comprises computer programming code capable of being executed by the designated client device, and wherein the application logic is selected based on the application information that is associated with the client device and that is stored on the application server.

* * * * *